United States Patent [19]

Morishita

[11] 4,264,853
[45] Apr. 28, 1981

[54] COMMUTATORLESS MOTOR DEVICE

[75] Inventor: Takashi Morishita, Tokyo, Japan

[73] Assignee: Tokyo Shibaura Denki Kabushiki Kaisha, Kanagawa, Japan

[21] Appl. No.: 952,196

[22] Filed: Oct. 17, 1978

[30] Foreign Application Priority Data

Oct. 27, 1977 [JP] Japan ............................ 52-128107

[51] Int. Cl.³ .......................................... H02P 7/42
[52] U.S. Cl. ................... 318/805; 318/723; 318/803
[58] Field of Search ............. 318/720, 721, 722, 723, 318/799, 800, 801, 802, 803, 805

[56] References Cited

U.S. PATENT DOCUMENTS

| | | | |
|---|---|---|---|
| 3,546,551 | 12/1970 | Risberg et al. | 318/805 |
| 3,796,935 | 3/1974 | Blaschke | 318/801 |
| 3,872,364 | 3/1975 | Hübner | 318/721 X |
| 4,186,334 | 1/1980 | Hirata | 318/805 |

FOREIGN PATENT DOCUMENTS

| | | | |
|---|---|---|---|
| 2348157 | 4/1975 | Fed. Rep. of Germany | 318/803 |
| 2615744 | 10/1977 | Fed. Rep. of Germany | 318/805 |
| 51-109414 | 9/1976 | Japan . | |
| 5086168 | 1/1977 | Japan | 318/721 |
| 5086193 | 1/1977 | Japan | 318/803 |

OTHER PUBLICATIONS

"Operational Characteristics of thyristor–motor with a controlled advance angle" by Hiroshi Nagase et al. Apr., 1978.
"Method for controlling a commutatorless motor of induced voltage commutation type under a constant margin angle ..." by Yoki Takeda et al., Apr., 1978.

Primary Examiner—J. V. Truhe
Assistant Examiner—Richard Moose
Attorney, Agent, or Firm—Stevens, Davis, Miller & Mosher

[57] ABSTRACT

In a commutatorless motor device including a synchronous motor driven through a frequency converter including gate-controlled electric valves, and a device for detecting the phase voltages of the synchronous motor, there is a device for multiplying a signal corresponding to a stator current of the synchronous motor with the detected phase voltages. The output signal of the multiplying device is added to the output signal of the phase voltage detecting device, and the sums are passed through a logic circuit and a gate-pulse generating circuit for generating gate pulses for controlling the electric valves of the frequency converter.

3 Claims, 6 Drawing Figures

COMMUTATORLESS MOTOR DEVICE

BACKGROUND OF THE INVENTION

This invention relates generally to commutatorless motors, and more particularly to a type thereof wherein induced voltages of a synchronous motor are utilized for detecting the rotor position, and the motor is thereby operated at a predetermined margin angle regardless of variation in stator current.

Known is a commutatorless motor device wherein an angular position of the rotating magnetic poles is detected by a proximity switch or the like, and the commutation of the stator current is controlled by the thus detected position indicative signal. This type of commutatorless motor device, however, cannot compensate for the displacement or shifting of the rotating magnetic field due to an armature reaction, and the power factor, and operational efficiency of the device is deteriorated during the light-load condition, thereby increasing torque ripples.

Recently, there has been developed a control system of commutatorless motors, wherein the position of the rotating magnetic flux is detected directly from the counter electromotive force of the motor, and the stator current is commutated under the control of the thus detected positional signal so as to compensate for any harmful effect of the armature reaction.

In this case, however, since the commutation is of the so-called natural commutation type which is controlled by the counter electromotive force of commutatorless motor, the commutation angle or angle of overlap during the operation of the controlled rectifiers, such as thyristors, is increased in accordance with the increase in the stator current, and a margin angle of commutation is thereby reduced. For this reason, it has been obliged to make large the margin angle under light load conditions so that the commutation advance angle would be excessive. Accordingly, it has been impossible to sufficiently improve the output characteristic of the motor.

As will be described in detail hereinafter with reference to the accompanying drawing, the reduction of the margin angle under a heavily loaded condition of the motor is prevented by beforehand increasing the advance angle of commutation to a great value which is unnecessary during the no-load operation of the motor. In other words, the margin angle of commutation for the control system of the commutatorless motor is varied by the load condition of the motor, thus deteriorating the output characteristics of the motor particularly in its light-load condition.

SUMMARY OF THE INVENTION

A primary object of the present invention is to provide a commutatorless motor device which can be operated at a constant margin angle of commutation regardless of the load condition of the commutatorless motor.

Another object of the invention is to provide a commutatorless motor device wherein the advance angle of commutation of the frequency converter is varied by an amount related with the phase current of the commutatorless motor, whereby the margin angle of the commutation is made substantially constant regardless of the load condition of the commutatorless motor.

According to the present invention, these and other objects can be accomplished by the provision of a commutatorless motor device which comprises a synchronous motor driven through a frequency converter including semiconductor switching elements, means for detecting the phase voltages of the synchronous motor, multipliers for multiplying a signal corresponding to the stator current of the synchronous motor with the detected phase voltages, respectively, adders for adding the outputs of the multipliers to the outputs of the phase voltage detecting means, respectively, a logic circuit for producing logic signals from the outputs of the adders, and gate-pulse generating means responsive to the logic signals for producing signals for controlling the controlled semiconductor elements.

The invention will now be described in detail with reference to the accompanying drawings wherein like parts are designated by like reference and characters.

DESCRIPTION OF THE PREFERRED EMBODIMENT

For a better understanding of the present invention, the aforementioned conventional control system of commutatorless motor utilizing the induced phase voltage thereof as a position detecting signal of the rotating magnetic field will now be described with reference to FIGS. 1 and 2.

Figure 1:
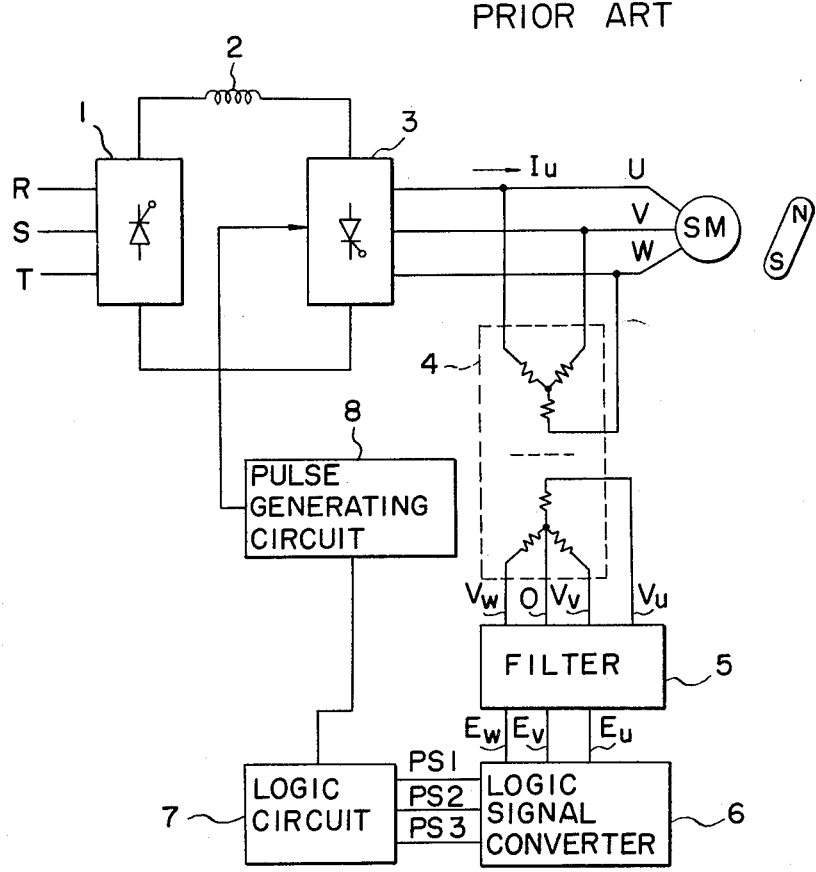
FIG. 1 is a block diagram showing a conventional commutatorless motor device.

In FIG. 1 showing a block diagram of the conventional control system of a commutatorless motor, R, S, and T designate three phase a.c. power lines, respectively, which are connected to a phase-controlled thyristor-type rectifying device 1, the d.c. output of which is connected through a smoothing reactor 2 to a phase-controlled thyristor inverter device 3. The rectifier device 1 and inverter device 3 constitute a frequency converter. A commutatorless motor generally designated by SM is a synchronous motor with a rotor having magnetic poles NS and a stator having stator windings, the input terminals of which are designated by U, V, and W. The phase currents of the synchronous motor are designated by $I_u$, $I_v$, and $I_w$, of which only $I_u$ is shown.

When the synchronous motor SM constructed as the commutatorless motor is operated, the phase voltages thereof are picked up by a transformer 4 to provide phase-voltages representing signals $V_u$, $V_v$, and $V_w$. These signals are then passed through a filter 5 for removing ripples or the like for obtaining fundamental waveforms $E_u$, $E_v$, and $E_w$ of the phase voltages.

Reference numeral 6 designates a converter wherein are obtained vector sums of selected pairs of the fundamental phase voltages $E_u$, $E_v$, and $E_w$, with the amplitude of each voltage being adjusted suitably, and wherein the polarities of the thus obtained sinusoidal waves are detected to deliver logic signals PS1, PS2, and PS3 indicative of the positions of the magnetic fluxes of the rotating magnetic poles of the synchronous motor SM. The position detecting logic signals PS1, PS2, and PS3 are thereafter sent to a logic circuit 7 to be processed therein, and the output signals therefrom are sent to a pulse generating circuit 8 which in turn delivers gating pulses to operate the thyristors of the inverter 3.

Because of the operational principle of the commutatorless motor, the gating pulses constituting commutation instructions for the thyristors of the inverter 3, should have a predetermined phase relation (termed a commutating advance angle) with the corresponding one of the phase voltages of the commutatorless motor SM. Since the position detecting signals PS1, PS2, and PS3 are obtained from the phase voltages of the motor, the aforementioned phase relation is of course satisfied.

Figure 2:
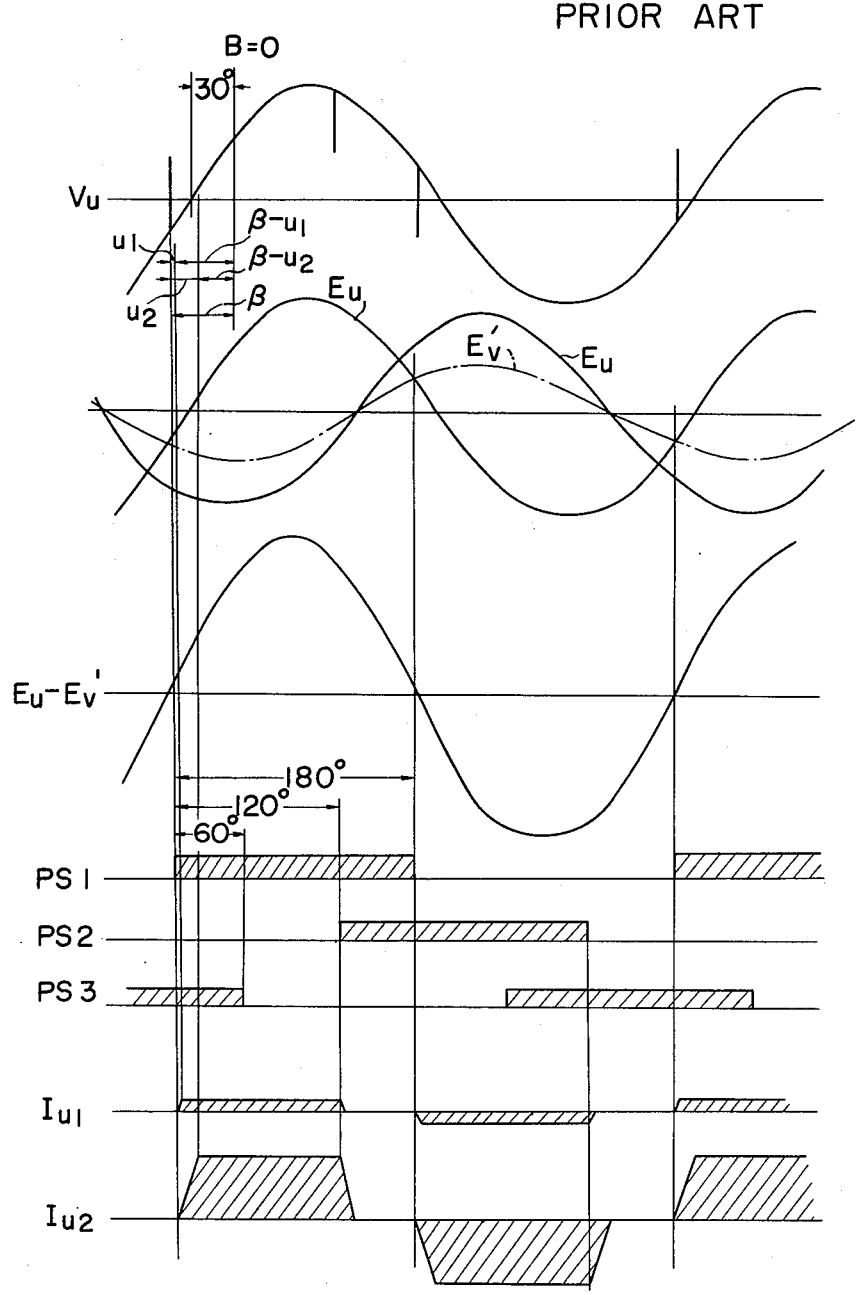
FIG. 2 is a timing chart showing waveforms at various parts of the conventional commutatorless motor device shown in FIG. 1.

In FIG. 2 showing waveforms of various parts of the conventional control system shown in FIG. 1, for instance, the phase voltage Vu obtained from the transformer 2 is passed through the filter 5, and shaped into the fundamental waveform Eu as described before. Assuming that Ev' designates a waveform having a smaller amplitude of the fundamental wave Ev representing the V-phase voltage, a difference Eu−Ev' is also a sinusoidal wave having a leading phase angle which is varied depending on the amplitude of the waveform Ev'. In the converter 6 of FIG. 1, differences such as Eu−Ev' are obtained for the three phase voltages, and logic signals PS1, PS2, and PS3 representing the polarities of the subtracted waveforms are obtained. When the thyristors in the inverter 3 are commutated by the gate pulses based on the logic signals PS1, PS2, and PS3, the commutation of the phase currents of the commutatorless motor SM starts while always maintaining a predetermined phase angle relative to the phase voltage of the motor.

In FIG. 2, $Iu_1$ designates the no-load current and $Iu_2$ designates the load current of the U phase of the commutatorless motor SM, and $u_1$ and $u_2$ designate commutation angles (or angles of overlap) at the time of the no-load operation and loaded operation, respectively. $\beta$ designates the aforementioned advance angle of commutation. Since the commutation angle $u_1$ at the no-load time is smaller than the commutation angle $u_2$ at a loaded time, the commutation margin angle $\beta - u_1$ is greater than the commutation margin angle $\beta - u_2$, which indicates that the commutation margin angle in the conventional control system of the commutatorless motor is increased during the no-load condition or a light-load condition of the commutatorless motor, whereby the power factor and the output charcteristics of the motor are deteriorated as the motor is operated in these conditions.

The above described disadvantage of the conventional control system of the commutatorless motor can be eliminated by a commutatorless motor device according to the present invention, which will now be described with reference to FIGS. 3 to 6.

Figure 3:
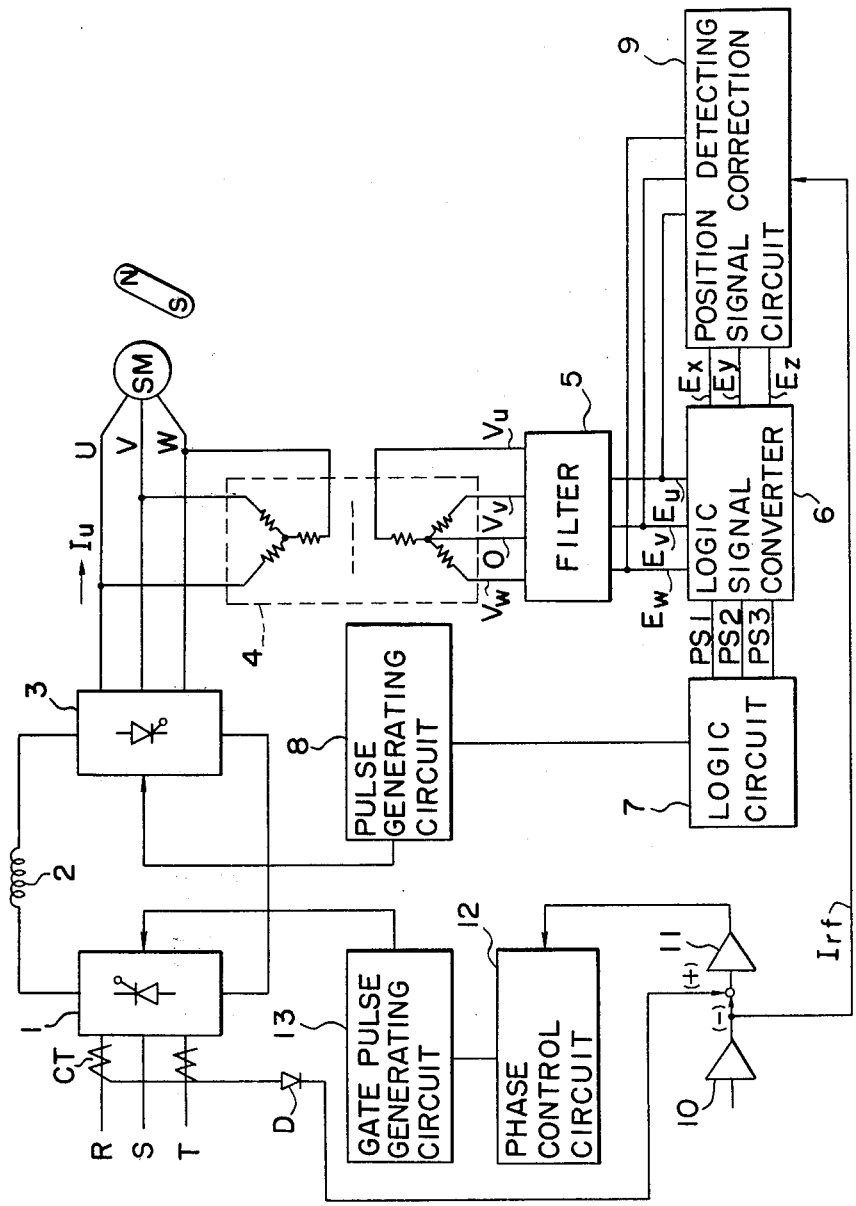
FIG. 3 is a block diagram showing an embodiment of the present invention.

A commutatorless motor device constituting a preferred embodiment of the present invention is illustrated in FIG. 3, wherein parts corresponding to those shown in FIGS. 1 to 3 are designated by the same reference characters, and repeated description of these parts are omitted for the simplification of the description.

As shown in FIG. 3 there are provided a position detecting signal correction circuit 9, connected to the output of filter 5, an operational amplifier 10 which delivers a reference current Irf for controlling or instructing the operational speed of the commutatorless motor, a current controlling operational amplifier 11, a phase control circuit 12 connected to the output of the operational amplifier 11, and a gate pulse generating circuit 13 responsive to the output of the phase control circuit 12 for the thyristors of the rectifier 1. Current transformers CT detect the input line currents to the rectifier 1, the output of the CT being rectified by a rectifier D and fed back to the input of the current controlling amplifier 11 which also receives the reference current Irf from the operational amplifier 10.

Figure 4:
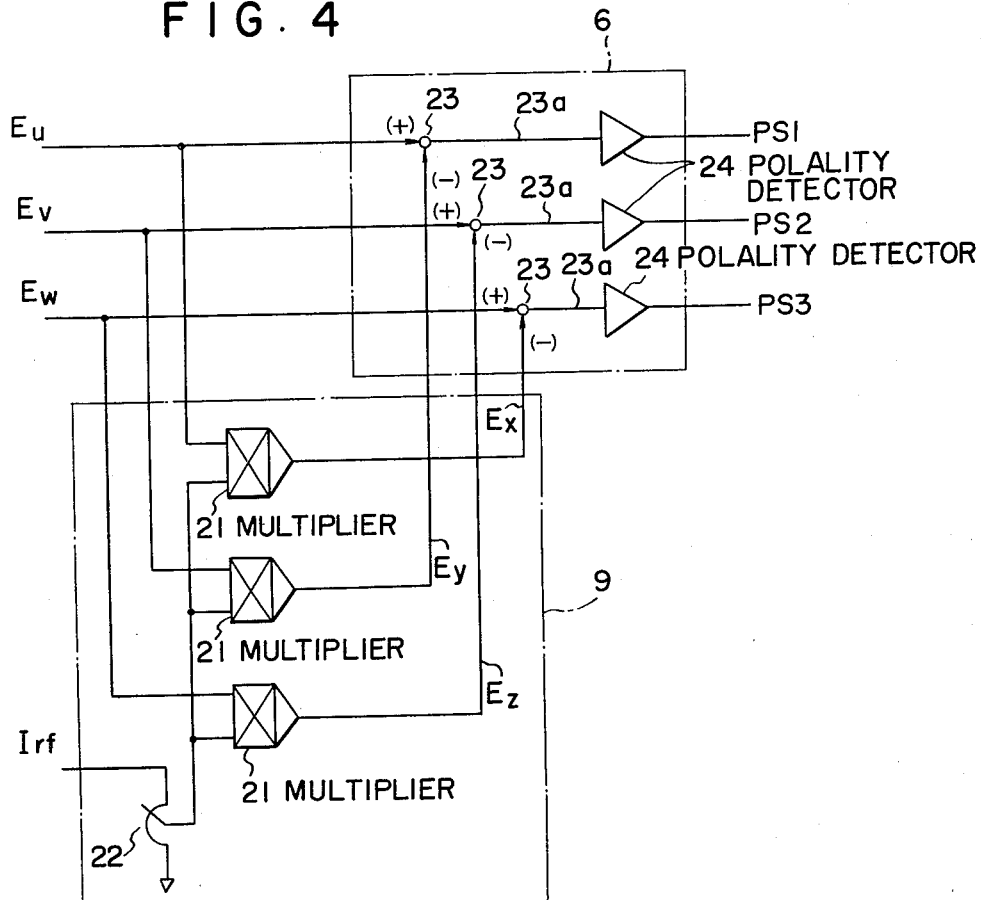
FIG. 4 is a circuit diagram showing the logical signal converting circuit and the position detection signal compensation circuit shown in FIG. 3.

Detailed constructions of the position detecting signal correction circuit 9 and the logic signal converter 6 which are essential to this invention are illustrated in FIG. 4.

In the positional signal correction circuit 9, there are provided multipliers 21 wherein the fundamental voltage waves Eu, Ev, and Ew are respectively multiplied by the reference current Irf obtained from the operational amplifier 10, and a variable resistor or rheostat 22 wherein the reference current Irf is varied to a suitable value. In the logic signal converter 6, there are provided adders 23 wherein the outputs Ex, Ey, and Ez from the multipliers 21 are added to the aforementioned voltage signals Ew, Eu, and Ev, respectively, so as to obtain sinusoidal waves 23a, and polarity detectors 24 wherein the polarity of the sinusoidal waves 23a are detected. The logic signals PS1, PS2, and PS3 are delivered by respective polarity detectors. It should be noted that each of these logic signals PS1, PS2, and PS3 corresponds to the position detecting signal for the rotating magnetic field described above.

The operation of the position detecting signal correction circuit 9 and the logic signal converter 6 will now be described with reference to FIG. 5.

The fundamental voltage signals Eu, Ev, and Ew are applied to signal converter 6 and the positional signal correction circuit 9. In the circuit 9, each multiplier 21 multiplies either one of the fundamental voltage signals Eu, Ev, and Ew with the rheostat-adjusted reference current Irf, which is intended to control the output current of the inverter 3, whereby each multiplier delivers a sinusoidal wave such as Ex, Ey, or Ez, which is in-phase with, but of a different amplitude from that of the fundamental voltage signal Eu, Ev, or Ew corresponding thereto. The amplitudes of the sinusoidal waves can be suitably varied by adjusting the magnitude of the reference current Irf by means of the variable resistor 22.

Figure 5:
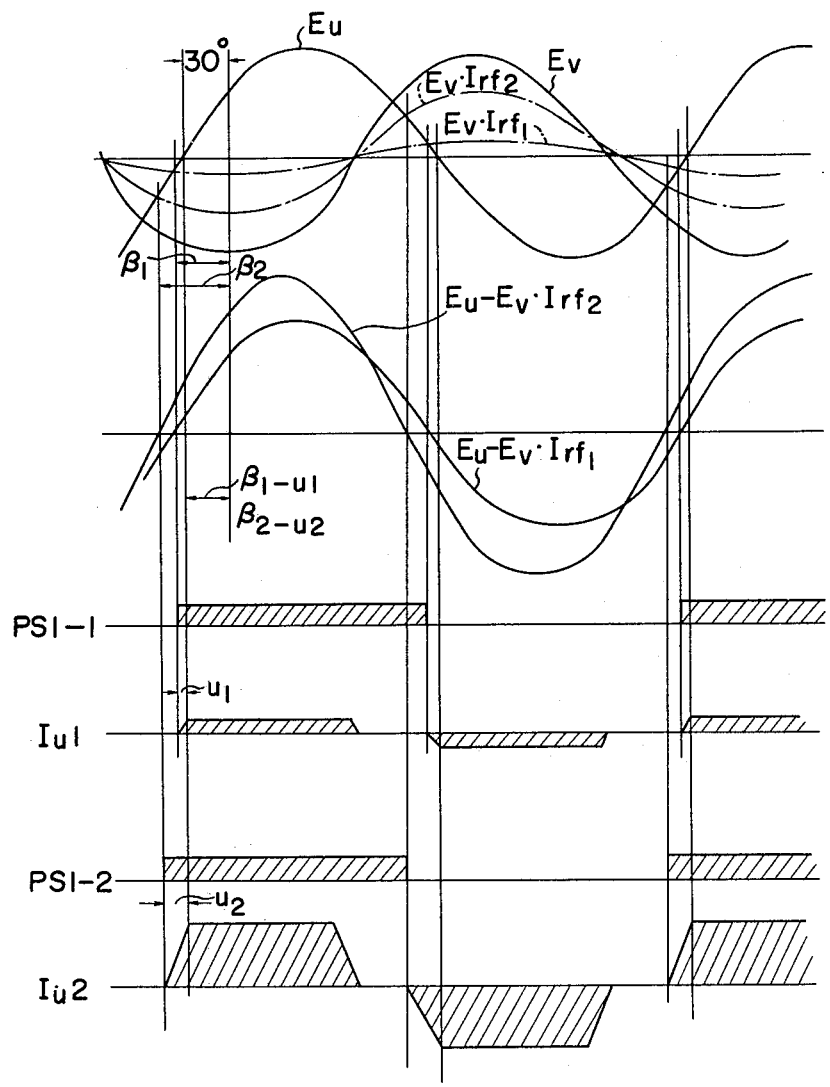

In FIG. 5, Eu represents the fundamental wave of the U-phase voltage, $Ev \cdot Irf_1$ the output from the multiplier 21 at the time of a light load, and $Ev \cdot Irf_2$ the output from the same multiplier 21 at the time of a heavy load. Thus, it is apparent that the outputs $Eu - Ev \cdot Irf_1$ and $Eu - Ev \cdot Irf_2$ obtained from a corresponding adder 23 are both leading in phase than that of the fundamental voltage signal Eu. Thus, an output PS1−2 generated by the polarity detector 24 during the time of a heavy load of the motor has a leading phase angle than that of another output PS1−1 from the same polarity detector during the time of a light load of the motor.

Thus, when the leading phase angles of the outputs of the respective polarity detectors 24 are adjusted by the variable resistor 22 in a manner such that the commutation margin angles at the time of no-load and rated-load are made equal, the variation of the commutation margin angle caused by the variation of the motor load as in the case of the aforementioned conventional control system can be eliminated.

In FIG. 5, $\beta_1$ and $u_1$ represent an advance angle and an angle of overlap, respectively, at the time of a light-load operation of the motor, and $\beta_2$ and $u_2$ represent these angles at the time of a heavy load, the commutation margin angles in these cases being expressed as $\beta_1-u_1$ and $\beta_2-u_2$, respectively.

Figure 6:
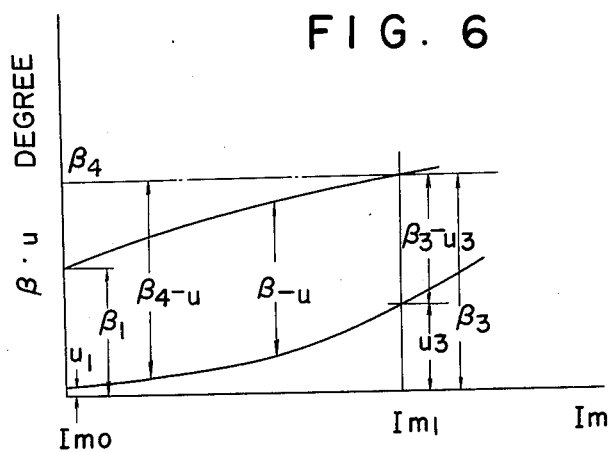
FIGS. 5 and 6 are a timing chart and a graph for explaining the operation of the present invention.

In FIG. 6, an example of variations of the advance angle $\beta$ and the overlapping angle $u$ is plotted against the variation of the phase current Im of the commutatorless motor. In this graphical representation, $\beta_1$ and $u_1$ correspond to the no-load operation, and $\beta_3$ and $u_3$ correspond to the rated current operation of the motor. $\beta_4$ represents an advance angle of commutation in a case where the present invention is not applied. From FIG. 6, it is apparent that the necessity of providing an excessive margin angle at the time of light-load operation can be eliminated by the present invention.

Although the invention has been described with respect to a preferred example, wherein the commutatorless motor is operated from a d.c. power source through an inverter, it is apparent that the invention is also applicable to a so-called a.c. type commutatorless motor utilizing a thyristor converter. Furthermore, as will be apparent from FIG. 5, Eu−Ev·Irf is equal to Eu when the phase currents of the commutatorless motor are approximately zero, thereby resulting in an advance angle of commutation equal to 30°. However, the advance angle at the time of no-load can be varied arbitrarily if the inputs to both of the logic signal converter 6 and the position detection signal correction circuit 9 are selected to be sinusoidal waves other than the aforementioned fundamental phase voltages Eu, Ev, and Ew, which are provided as vector-sums of the phase voltages having desired phase difference from the phase voltages.

What is claimed is:

1. A commutatorless motor device comprising a synchronous motor driven through a frequency converter including controlled semiconductor switching elements, means for detecting the phase voltages of the synchronous motor, multipliers for multiplying a signal related to a stator current of the synchronous motor with the output signals of said phase voltage detecting means, respectively, adders for adding the outputs of said multipliers to the outputs of said phase-voltage detecting means, respectively, a logic circuit for producing logic signals from the outputs of said adders, and gate-pulse generating means responsive to said logic signals for producing signals for controlling said controlled semiconductor elements.

2. A commutatorless motor device as set forth in claim 1 wherein said signal related to a stator current of the synchronous motor is a reference current for instructing the operational condition of the commutatorless motor.

3. A commutatorless motor device as set forth in claim 1 which further comprises a variable resistor connected to each of said multipliers for varying said signal relating to a stator current such that the commutation margin angle of the frequency converter at the time of no load and rated load are thereby made equal.

* * * * *